Feb. 6, 1968 S. LEVINE 3,367,026
POWER OPERATED KNIFE WITH RECIPROCATING SLICING BLADE
AND ELECTRIC MOTOR LOCATED REMOTELY OF THE BLADE
Filed July 22, 1965 3 Sheets-Sheet 1
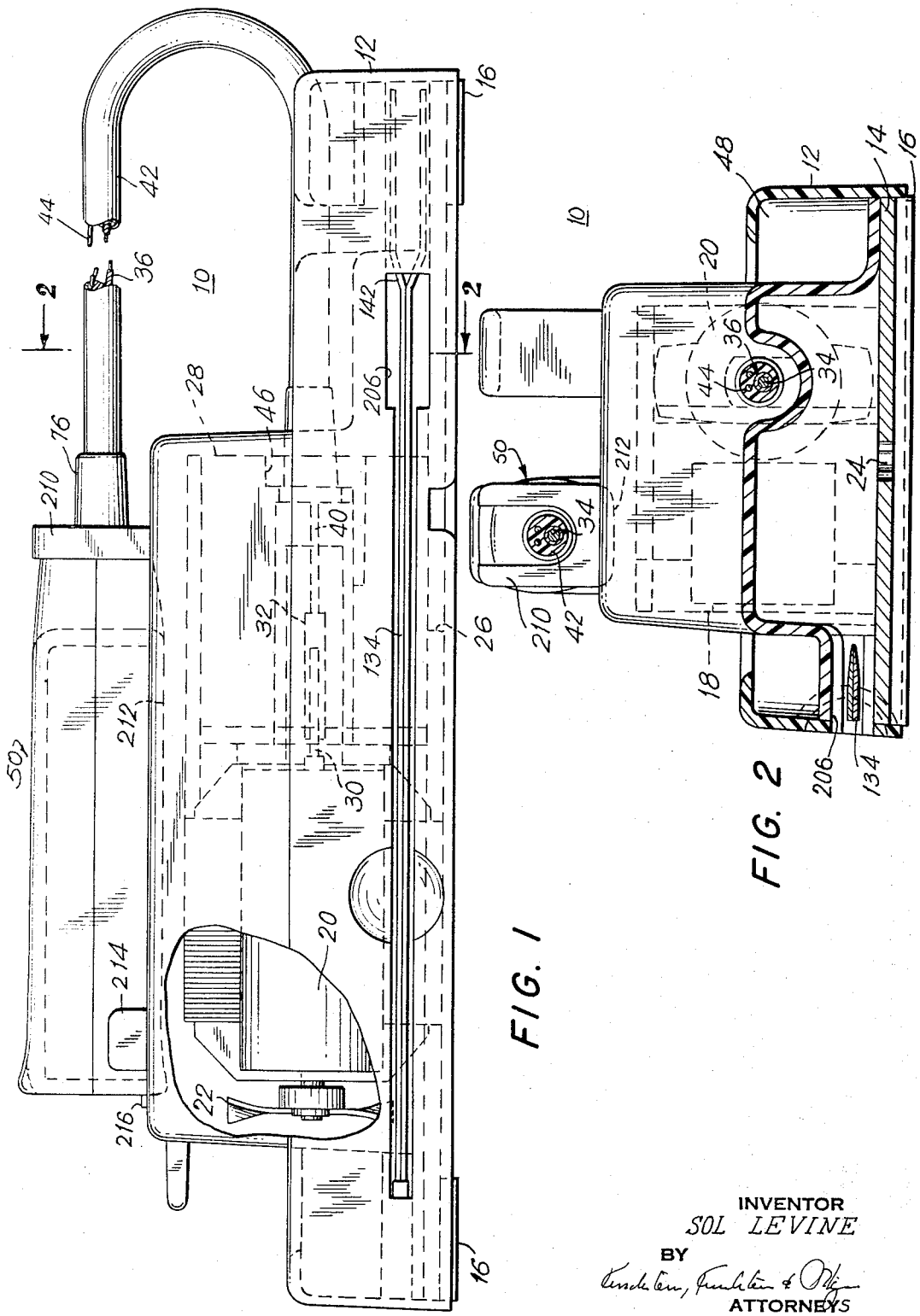
INVENTOR
*SOL LEVINE*
BY
ATTORNEYS

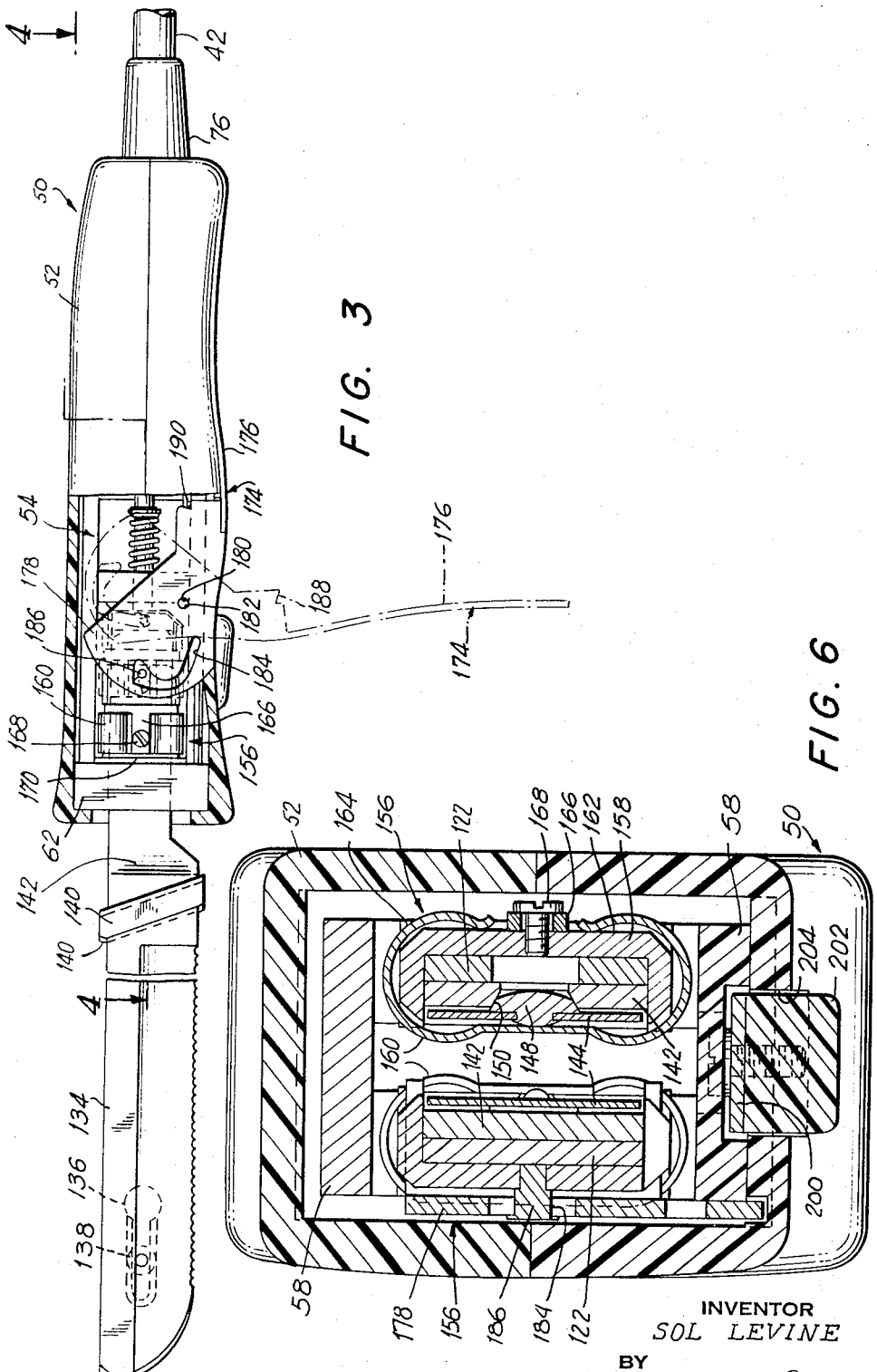

Feb. 6, 1968 S. LEVINE 3,367,026
POWER OPERATED KNIFE WITH RECIPROCATING SLICING BLADE
AND ELECTRIC MOTOR LOCATED REMOTELY OF THE BLADE
Filed July 22, 1965 3 Sheets-Sheet 3

INVENTOR
*SOL LEVINE*
BY
*Kirschstein, Kirschstein & Ottinger*
ATTORNEYS

United States Patent Office 3,367,026
Patented Feb. 6, 1968

3,367,026
POWER OPERATED KNIFE WITH RECIPROCATING SLICING BLADE AND ELECTRIC MOTOR LOCATED REMOTELY OF THE BLADE
Sol Levine, 35 Park Ave., New York, N.Y. 10016
Filed July 22, 1965, Ser. No. 474,042
4 Claims. (Cl. 30—272)

ABSTRACT OF THE DISCLOSURE

A power operated knife in which a motor is secured on a stationary base and has extending therefrom a flexible drive shaft which is joined to a handle. A device in the handle converts the rotary motion of the drive shaft to a reciprocating motion. A pair of slicing blades are detachably connected to the handle and are reversely operated by the converting mechanism.

---

This invention relates to a power operated knife with a reciprocating slicing blade and with an electric motor located in a stationary base remotely of the blade.

Power operated electric knives with reciprocating blades as presently marketed are subject to several drawbacks which tend to override their desirable qualities and to prevent many householders from purchasing these highly useful implements. One problem of particular concern is that the knives are quite heavy, this arising from the location in all such knives of the electric motor within the handle from which the blade or blades protrude. An electric motor of reasonable capacity inherently is of considerable weight, particularly in proportion to the weight of the remainder of the knife, and therefore tends to disproportionately increase the over-all weight. This same factor, i.e., the presence of an electric motor in the handle, creates another problem, to wit, that of obtaining the proper balance or heft to the knife. The concentration of weight at the center of gravity of the motor necessitates rearrangement of all the parts of the knife, sometimes in an awkward manner, in order to enable the user to grasp the handle at the center of gravity of the knife. Still further, because the motor must be of a rather appreciable fraction of a horsepower, a very small motor cannot be used and the size of the motor necessary for the supply of sufficient driving power tends to make a knife handle containing the motor unduly large and, therefore, not comfortably grasped by a user. Even the best designed motor does not run with complete silence and lack of vibration. Motors used in electric knives are not made to the same fine tolerances as motors used for controls and therefore are subject to considerable noises and vibration in their operation. Such noise and vibration are transmitted to the user's hand because the motor is in the handle and are transmitted to the knife blades which, because of this, chatter annoyingly.

It is one of the principal objects of my invention to provide a power operated knife of the character described which is not subject to any of the foregoing defects.

It is another object of my invention to provide a power operated knife of the character described which avoids these defects by transferring the location of the electric motor which powers the knife from the handle to a point remote from the handle and the blades.

It is another object of my invention to provide a power operated knife of the character described in which the handle is far lighter in weight than that of present-day power operated knives, and in which the center of gravity can be conveniently adjusted to the configuration of the handle rather than the configuration of the handle being specially adapted to the center of gravity of the motor.

It is another object of my invention to provide a power operated knife of the character described which is free from noticeable vibrations, which has a good balance and feel and in which the blades run substantially noise and chatter free.

Another drawback of conventional present-day power operated knives is that even with knives which draw their energy through a power cord from a domestic power system the motors are not powerful enough to operate satisfactorily under all adverse conditions. There is a balancing of various factors. The motor should be sufficiently powerful to perform most cutting operations but must not be so large that its weight or size is impractical. Accordingly, up to now a comprise has been struck between power on the one hand and size and weight on the other. It is an object of the present invention, however, to provide a knife of the character described which is sufficiently powerful to perform under the most adverse conditions likely to be encountered by it, such object in part being accomplished by locating the motor remotely of the knife, so that the same controlling factors which prevail in the case of conventional knives are not present, and in part being accomplished by using a different type of motor which supplies sufficient torque, when necessary, to reciprocate the blades under adverse conditions without appreciably decreasing the cutting speed of the blades.

It is another object of my invention to provide a knife of the character described which, instead of the usual universal motor whose speed varies inversely with load, employs a synchronous motor, which characteristically will supply a substantially constant speed under load.

It is another object of my invention to provide a knife of the character described in which noise and chattering of the blades is reduced to a minimum by employing a novel kinematic mechanism for converting the rotary motion of the motor into the reciprocating motion of the blades.

It is another object of my invention to provide a power operated knife of the character described in which the driving motor is located remotely of the handle and is connected thereto by a flexible driving cable.

It is another object of my invention to provide a power operated tool or knife such as set forth in the immediately preceding object, in which the control for the motor is carried by the handle so that the operator can most conveniently regulate the motor.

It is another object of my invention to provide a power operated knife of the character described which is neat and attractive in appearance, efficient and reliable in operation, and so designed that it can be made economically at a low cost.

Other objects of my invention in part will be obvious and in part will be pointed out hereinafter.

My invention accordingly consists in the features of construction, combinations of elements and arrangements of parts which will be exemplified in the power operated knife hereinafter described and of which the scope of application will be indicated in the appended claims.

In the accompanying drawings in which is shown one of the various possible embodiments of my invention, FIG. 1 is a partially broken away side view of a power operated knife constructed in accordance with my invention and constituting a handle supported on a platform rest which contains the electric driving motor and in which a flexible cable connects the motor to the handle;

FIG. 2 is a sectional view of said knife taken substantially along the line 2—2 of FIG. 1;

FIG. 3 is a side view, partly broken away, of the knife handle and blades;

FIG. 6 is a still further enlarged transverse sectional view taken substantially along the line 6—6 of FIG. 4.

Figure 4:
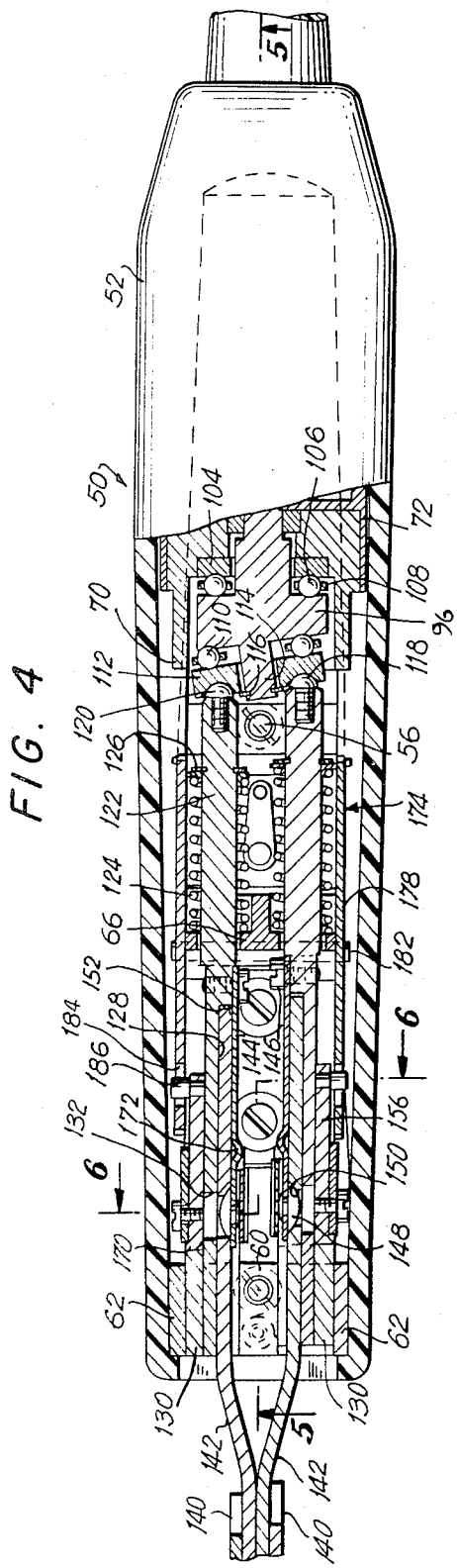
FIG. 4 is an enlarged fragmentary sectional view taken substantially along the line 4—4 of FIG. 3.

Referring now in detail to the drawings, and for the moment to FIG. 1, the reference numeral 10 denotes a power operated knife constructed in accordance with and embodying my invention. Said knife is composed of a stationary portion and of a tethered portion freely movable relative thereto within the limits of the tether. The tether constitutes a flexible power cable and the movable portion constitutes a handle and a set of slicing blades.

More particularly, the stationary portion is in the form of a base 12 which conveniently is molded from plastic and which has a hollow interior for accomodation of various parts soon to be described. The open bottom of the base is closed by a metal cover plate 14. Feet 16, which conveniently may be in the form of rubber or synthetic rubber pads, are affixed to opposite bottom end portions of the cover plate and serve to space the bottom edge of the base slightly away from a horizontal supporting surface so as to permit ventilation of the electrical components contained within the base. The principal electrical components are a step-down transformer 18 and a motor 20, both of which are secured, as by screws (not shown), to the cover plate 14 on the upper surface thereof within the hollow interior of the base 12.

The motor is, in a preferred form of my invention a synchronous motor of the shaded pole type. This enables the motor to supply at its output shaft a substantial torque at a substantially non-varying speed. Under light loads the rotor lags only slightly behind the rotary magnetic field, but essentially is in synchronism therewith. As heavier loads are imposed, the rotor will slip with respect to the field but still will maintain a high speed which approximates within a small percentage the speed of the rotating magnetic field. In order to enable a motor of compact size to be used and yet one which furnishes substantial power, I employ a low voltage motor, and to convert the house current from its normal approximately 110 volt supply to an appropriate low voltage, e.g., 24 volts, I insert the transformer 18 electrically between the input power cord (not shown) and the motor supply terminals. Furthermore, to keep the motor cool and therefore efficient, the non-driving shaft thereof suitably has a fan 22 fixed thereon.

The cover plate 14 includes a pair of aligned keyhole openings 24 that permit the base 12 to be hung on a wall and that also permit ingress and egress of cooling air. Additionally, the cover includes a large opening 26 that leads directly to a storage compartment 28 on the inside of the base 12 for receiving a power twin lead line cord (not shown) when the knife is not being used. This is the cord which supplies electric energy to the motor 20.

The output shaft 30 (FIG. 1) of the motor is coupled to a socket 32 which is operationally integral with the driven end of a central flexible wire core 34 of a conventional flexible drive shaft 36, said drive shaft further including a flexible helical metal strip in the form of a tube 38 which closely ensheathes the wire core 34. As is well known, the tube can be flexed into any configuration having reasonably small radii of curvature, as small, for instance, as one inch, and the core will follow such curvature although it still can turn with relative freedom within the tube. The end of the tube 38 proximate to the motor is rigidly held, as by means of a split clamping ring 40, fast on the base. The flexible drive shaft is of considerable length, for example, four and one-half feet, and the length thereof, except for its terminal portions, is encased in a cable cover 42 formed from an elastomeric plastic, such as butadiene, for example, or polyvinyl chloride. Thereby the drive shaft, which is rather unsightly, is concealed and, moreover, the same is protected from contact with aqueous and fatty liquids and greases which characteristically are present in the vicinity of the food cutting operation. For a reason which later will be apparent, I provide a pair of electric lead wires 44 within the plastic cable and running substantially the full length thereof. The end of the cable proximate to the motor is formed with a circumferentially grooved head 46, the groove being received in a clamping bracket inside of the base to assimilate any longitudinal stress on the cable and thereby to relieve the lead wires and flexible drive shaft from such stress. The end of the head protrudes from the base to provide reinforcement for this much flexed segment of the drive shaft and wires.

The power cable, as thus constituted, forms a flexible tether for a slicing knife, permitting the knife to be moved about freely in any direction within the limits imposed by the tether. The cable supplies mechanical power to the knife and through the wires 44, enables the user to regulate the slicing action.

When the knife is not in use, it is desirable to store the power cable, and to serve this function a deep groove 48 runs around the base 12 slightly inwardly from the periphery thereof.

The distal end of the power cable terminates at a knife handle 50 which is designed to carry: the slicing blades, a mechanism for converting the rotary motion of the drive shaft into the reciprocating motion necessary to operate the slicing blades, and an arrangement for detachably securing the knife blades to the converting mechanism.

The handle includes an outer casing 52 formed from a pair of matching half-shells which are joined to define an elongated shape that will fit comfortably in a person's hand. The casing houses the converting mechanism and the blade securing arrangement, both of which are supported by a frame 54 in the casing. The two halves of the casing are secured to one another and to the frame by bolts 56 (FIG. 5) having their heads countersunk in openings in one half-shell of the casing, their shanks passing through bores in the frame 54 and their tips threaded into tapped sockets in the other half-shell of the casing.

The frame 54 is composed of a pair of parallel longitudinally extending broad flat aligned coextensive plates 58. The uppermost plate (as viewed in FIGS. 5 and 6) is of metal, and the lowermost plate is of a sturdy plastic, preferably a thermoset electrically non-conductive plastic which will not be affected by heat. A satisfactory plastic is a phenolformaldehyde condensation resin.

The plates are rigidly joined to one another by spacer blocks to form a solid skeleton frame. More particularly, I interpose a separator block 60 between the plates at the front end thereof. "Front" in this context denotes the end of the handle proximate to the knife blades and "rear" the end of the handle proximate to the power cable. The separator 60 bridges the gap between the plates 58 and moreover, is narrow and is located midway between the widths of the plates at the front of the handle (FIG. 4) so that, as soon will be seen, the tang of one knife blade can slide on one side face of the block 60 and the tang of the other knife blade can slide on the other side of said block. The front bolt 56 passes through an opening in the separator. Furthermore, to maintain the front end of the frame rigid, I encompass the same in a rectangular encircling band 62 which constricts the plates 58 on the block 60. The band 62 is secured to the block 60 by screws 64.

A wide intermediate separator block 66 is disposed between the plates at approximately the center of their lengths and is held to the plates by screws (not shown). The block 66 is approximately as wide as the plates.

A third separator block 68 is located between the plates adjacent their rear ends. This last block is clamped between the plates by the rear bolt 56 passing through a bore in said block, and by screws (not shown).

Finally, the extreme rear ends of the plates are held apart by a bearing block 70. This block, too, is located between the plates and is squeezed by said plates which further are held thereto by screws (not shown).

It thus will be apparent that the frame 54 is a skeletonized rigid structure which is compartmented longitudinally by the separator blocks, the band 62 and the rear block 70. This frame serves to support the rotary-to-reciprocating conversion mechanism and the knife blade securing apparatus.

An enclosure can 72 (FIG. 5) with a rear end wall 74 has its open forward end rigidly coupled to a rearwardly protruding circular section of the block 70. The can essentially constitutes a portion of the frame 54.

The end of the power cable 42 remote from the motor 20 terminates in an enlarged head 76 (FIG. 5) which is circumscribed immediately in back of the flanged end 77 thereof by a rectangular washer 78 that is frictionally tight on the cable and that is fixed to the handle 50, as by screws 80, to provide a strain relief that absorbs longitudinal tension between the handle and the cable. The plastic covering for the lead wires 44 and the flexible drive shaft 36 terminates inside the handle 50 immediately beyond the head 76 to expose said lead wires and the flexible tube 38. At this point the tube is tightly gripped by a split clamping ring 82 that is fast to the rear end wall 74 of the can 72. The lead wires 44, which also extend from the head 76, run through a groove 84 in the clamping ring on their way toward the front end of the handle.

The flexible tube 38 terminates at the forward end of the clamping ring to thereby expose the forwardly projecting end of the central wire core 34 which is the active rotary element of the flexible drive shaft.

It will be apparent from the description thus far, that I have successfully isolated the knife handle 50, that is to say, the tool element which carries the cutting implement, from the electrically powered driver, which is the electric motor, and thereby I have been able to a substantial degree to reduce noise, chatter and vibration at the handle and knife blades and also have been able to design and proportion the knife handle so that it will fit comfortably in the hand, is light in weight, will have its center of gravity located for convenient operation, and will have the blades correctly carried with respect to the handle for efficient cutting operation. All of these factors heretofore have been detrimentally affected by the presence of the motor within the handle.

Moreover, in previous power operated knives wherein the electrically energized driving unit terminated in a rotating driving shaft oriented longitudinally of the knife handle, it has been the practice to employ a gear transmission and crank pins to transform such rotary motion into the requisite reciprocating motion for the slicing blades. The gearing has been noisy and a source of vibration. To avoid this, I provide a different form of conversion mechanism having special advantages such as smoothness of operation, a low noise factor and a low amplitude of vibration for the present field of use.

Figure 5:
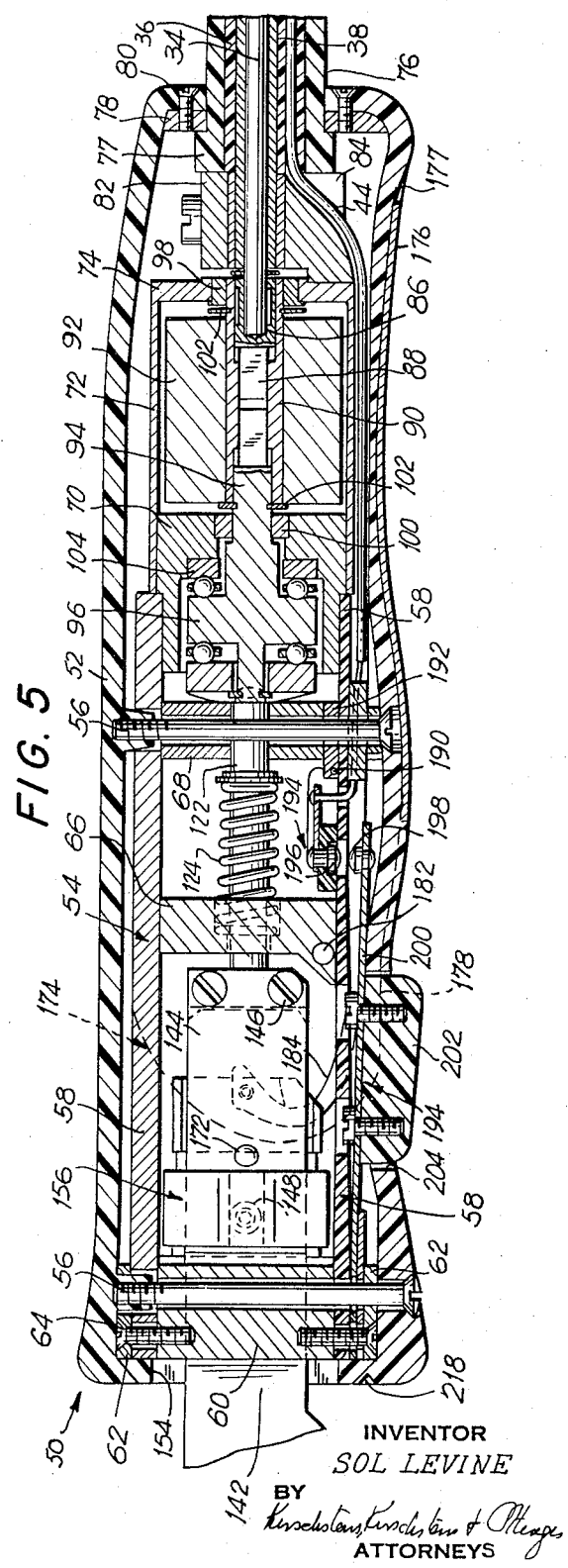
FIG. 5 is an axial vertical central sectional view taken substantially along the line 5—5 of FIG. 4.

The rotary-to-reciprocatory mechanism forming part of my invention is attached to the forwardly projecting end of the central wire core 34 where it emerges from the clamping ring 82 (FIG. 5). Said end of the wire core is crimped in the base of a socket 86, the forward end of which constitutes a cup of rectangular cross-section. Received in the cup is the rear end of a square cross-section coupling pin 88 which is fast within a coupling sleeve 90. The sleeve 90 is a push-fit in a cylindrical metallic mass 92 constituting a counterbalance which is proportioned and located to inhibit dynamic unbalance of rotary parts within the rotary-to-reciprocatory conversion mechanism. The forward projecting end of the pin 88 is of square cross-section and is received in a socket 94 which is the tail of a swash plate 96, said tail being fitted into the forward end of the sleeve 90. The sleeve 90 and the socket 94 rotate jointly as a unit and are mutually journaled in a bearing 98 in the rear wall 74 of the can and in a bearing 100 in the block 70. The counterweight 92 is prevented from shifting along the length of the sleeve 90 by a pair of C-rings 102.

The swash plate basically constitutes a revolving member having a driving surface which is inclined at a small angle, e.g., about 15°, with respect to the axis of revolution of the member. The particular swash plate here employed further includes anti-friction bearings such, for instance, as ball bearings, to reduce friction.

The tail of the swash plate passes freely through the central opening of a hardened steel bearing race 104 tightly held within a hollow forward bore of the block 70 and on which a series of ball bearings 106 ride, the same being held in a circular pattern by a cage 108. The rear surface of the swash plate 96 is perpendicular to the axis of rotation of the swash plate tail 94 and is parallel to the front face of the race 104. Hence, the swash plate can be rotated smoothly and with ease within the block 70. The front face of the swash plate is inclined to the axis of rotation of the sleeve 90, the angle of inclination being rather slight, e.g., in the order of 15°, and sufficient only to obtain the throw to be imparted to the slicing blades. Such throw is equal to the distance, parallel to the axis of rotation of the coupling sleeve, of the highest and lowest parts of the front face of the swash plate at the radius at which the swash plate reciprocatingly drives the knives. To minimize friction at the driving end of the swash plate, I provide a circular caged series of ball bearings 110 that ride on said front face and are located between said front face and centrally apertured race 112. The front face of said race 112 constitutes the driving surface for the swash plate. The aperture of said race 112 is slipped over an angled stub axle 114 that extends perpendicularly forwardly from the center of the front face of the swash plate. The race 112 is held against the ball bearings 110 by a C-ring retainer 116 carried by the tip of the axle 114.

It will be apparent that as the swash plate turns, the front face of the race 112 acts as a face cam to progressively advance and then permit the retraction of any follower element which bears upon such face at a point spaced from the center of rotation thereof. This therefore will serve to convert rotary motion about an axis extending longitudinally of the handle to reciprocating motion in a direction parallel to said axis and the conversion is accomplished without the use of a gear train with its inherent noise, chatter, vibration and inefficiency.

The front face of the race 112 is formed with an annular circular groove 118 adjacent the periphery of the race in which there ride the hardened spherical follower heads 120 of a pair of push rods 122. The push rods are disposed on diametrically opposite sides of the axis of rotation of the swash plate so that the heads 120 bearing on the swash plate rest on diametrically opposite sides of said axis. The push rods are spaced equidistantly from the center of rotation of the race 112 and, hence, will experience like amplitudes of motion.

Suitable means is included to mount the push rods for slidable reciprocatory translation parallel to the axis of rotation of the swash plate, said means, as shown, being in the form of bearing openings in the intermediate and rear separator blocks 66, 68 (FIG. 4). In a preferred form of my invention the rear separator block is formed of a coherent graphite mass to minimize friction in the guidance of the push rods.

Means also is included to bias the push rods against the swash plate, such means being in the form of coil compression springs 124, each of which encircles a different push rod near its rear end. The rear ends of the compression springs bear against C-rings 126 snapped to the push rods a short distance from the follower heads and the front ends of the springs are received in sockets in the rear surface of the intermediate separator block, so that the springs are under compression and cause the heads 120 to follow the groove 118 when the affiliated portion of the swash plate experiences rearward axial movement. The springs prevent free play of the push rods and do so without the use of high precision parts, thereby achieving a close fit of the driving parts that is conducive to low noise and minimal vibration and accomplishing these desirable results at a low cost.

The front ends of the push rods extend forwardly toward the front end of the handle, said front ends being enlarged to provide a substantial vertical height and rectangular configuration in elevation as viewed in FIG. 5. Said front ends of the push rods are formed with long shallow recesses 128 which face both forwardly and centrally of the knife handle, the recesses in the front ends of the two push rods facing one another and each recess being elongated longitudinally of the handle and extending across the full width of the enlarged front end. The tip of each enlarged front end of each push rod is received in and slides against a gib 130, the gibs being U-shaped to receive the aforesaid enlarged front ends of the push rods and the gib bases facing one another across the front separator block 60. The bases of the recesses in the gibs are spaced outwardly from the side faces of the front separator block by a distance sufficient to accommodate the enlarged front ends of the push rods and an additional distance sufficient to slidably accommodate the tangs of the two slicing blades. The gibs 130 are held between the upper and lower plates 58 by the constricting action of the band 62 and by the screws 64. Each enlarged forward portion of the push rod includes a large through aperture 132.

It will be apparent that when slicing blades are coupled to the enlarged front ends of the push rods, the blades will experience opposite reciprocatory movement such as is characteristic of conventional power operated slicing knives.

The slicing blades employed with my knife are of substantially conventional configuration and construction. Each blade 134 is of elongated shape with a blunt top edge and a sharpened serrated bottom edge. The blades are adapted to be carried by the handle and secured to the driving mechanism contained therein in a fashion such that the blades are substantially coextensive longitudinally and in transverse registry, with the interior facing surfaces of the blades juxtaposed and in sliding contact. To maintain this contact, the front end of one blade includes a keyhole slot 136 that extends longitudinally of the blade and the front end of the other blade carries a headed rivet 138 the shank of which is slidable in the narrow section of the keyhole slot and the head of which is slightly smaller than the large diameter portion of the keyhole slot, thus enabling the front ends of the blades to be coupled or uncoupled when both blades are detached from the knife handle and can be swung with respect to one another about the axis of the rivet 38. During a slicing operation the throw of the blades is less than the length of the narrow section of the keyhole slot and movement of the rivet is limited to this section.

Drip grease guards 140 are mounted on the rear of each of the blades.

The rear ends of the blades terminate in tangs 142 which include outwardly flaring sections, so that the parallel back ends of the tangs are spaced from one another. These back ends of the tangs are receivable in the recesses 128 and are connected to the enlarged forward ends of the push rods so as to be reciprocated thereby when the latter are in turn reciprocated by the rotating swash plate.

Pursuant to a feature of my invention, I provide an easily manually manipulatable means for detachably coupling the tangs of the two slicing blades 134 to the push rods 122 in a fashion such that when the coupling is effected, the tangs and push rods are positively interconnected (locked) and cannot come apart accidentally, as for example, by accidentally depressing a spring. Essentially, said coupling means includes a different protuberance reciprocable with each different push rod and spring loaded toward the tang 120, said protuberance being receivable in an aperture in the tang of the associated slicing blade and the protuberance being lockable therein by a collar which is slidable with respect to the length of the push rod and which in blade locking position, inhibits transverse movement of the locking projection out of the aperture, while in blade releasing or blade receiving position it permits the protuberance to be forced away from the aperture in the tang.

Inasmuch as identical coupling means are provided for both push rods and slicing blades, only one will be described. Such coupling means include a broad leaf spring 144 (FIGS. 4, 5 and 6) which is coextensive with the enlarged front end of the associated push rod and is held thereto as by screws 146. The screw connection is adjacent the closed back end of the recess 128 whereby the leaf spring is cantilever supported at its rear end and extends out over the recess 126, being spaced from and, in repose, parallel to the long wall of said recess. Adjacent its front end the leaf spring carries a protuberance 148 the shank of which is riveted to the spring. The protuberance is of rounded configuration with a chamfered rim adjacent its base and extends from the spring toward the long wall of the recess 128, thereby intruding into the space which will be occupied by the rear end of the associated tang of the slicing blade.

The tang 142 of the slicing blade is fashioned with a through aperture 150 which is so positioned that when the rear end of the tang butts against the narrow closed wall of the recess 128, the aperture 150 is transversely aligned with the protuberance 148. The walls of said aperture 150 taper transversely outwardly as best can be seen in FIG. 6. Moreover, the corner of the inner face of the rear tip of the tang includes a chamfer 152 (FIG. 4) facing in the general direction of the leaf spring 142. Hence, when a tang 142 is inserted through the opening 154 at the front end of the knife handle, and with the outer face of the tang sliding against the inner face of the enlarged front end of the push rod, the chamfer 152 will engage the protuberance 148 and cam the same outwardly out of the way of the entering tang. When the tang strikes the narrow closed rear end of the recess 128, the protuberance 148 will be aligned with the aperture 150 and said protuberance will snap into this aperture under the influence of the spring 144 which has been stressed by its inward flexing movement induced by entry of the tang. The upper and lower edges of the tang will at this time, slide against upper and lower flanges on the U-shaped gib 130, so that the tangs not only will be coupled to the push rods, but also will be restrained against vertical movement relative to the knife handle.

It will be appreciated that the coupling as thus far described, although functionally engaging the tangs of the knife blades to the enlarged front ends of the push rods, is neither a firm nor a positive coupling inasmuch as if the slicing blades should encounter an obstruction as they reciprocate, they would tend to cam the protuberances out of the associated apertures. Hence, as indicated previously, the coupling means of my present invention includes means to selectively inhibit inward flexing movement of the cantilever springs 144. Said inhibiting means provides the desired positive lock. The inhibiting means is in the form of a pair of collars 156 (FIG. 6) each of which constrictively embraces three elements, to wit, the enlarged forward end of a push rod, the associated tang, and the associated cantilever leaf spring 144, the collar being of limited length longitudinally of the tang (FIG. 3), so that it can slide longitudinally thereof.

The collar is arranged to move with the reciprocating push rod, tang and spring during a slicing operation so that it will maintain the associated blade positively locked to the push rod and yet the collar is arranged to exert a resilient constrictive action on the leaf spring 144 in order to allow it to clear a certain locking detent later to be described. Both collars are identical so that only one will be described.

A collar 156 includes a rigid U-shaped shoe 158 (FIG. 6) the base of which slides on the outer face of the enlarged front end of the push rod and the short inwardly extending arms of which embrace the forward end of said front end of the push rod and contact the upper and lower edges thereof. Moreover, the arms embrace a tang received in the knife handle and contact the upper and lower edges thereof. This latter contact serves to further steady the connection of the slicing blades to the push rods. The tips of both arms of the shoe are bridged by a prehensile C-shaped leaf spring 160. The tips of the spring engage shallow grooves 162 in the outer face of the shoe 158. The bights of the spring engage and extend over the upper and lower edges of the shoe, being received in notches 164 formed in the upper and lower corners of the shoe. The portion (base) of the spring opposite to the tips is located so as to bear against the inner face of the protuberance-carrying leaf spring 144 and urges the same outwardly. The spring 164 is rather stiff and is considerably stronger than the spring 144. A retainer plate 166, secured as by a screw 168 to the outer face of the shoe, cooperates with a flange 170 on the front end of the shoe to provide the grooves 162 that hold the C-spring 160 in place.

When the collar 156 is in its forward position, as shown in FIGS. 3, 4 and 5, near the front end of the push rod, the base of the C-spring 160 bears against the leaf spring 144 and holds the protuberance 148 in the aperture 150 of the knife blade tang, thus positively locking the tang to the push rod and preventing the knife blade from coming loose accidentally. However, when the collar 156 is slid rearwardly relative to the push rod from the position indicated in the aforesaid figures, the C-spring no longer will bear on the part of the leaf spring 144 carrying the protuberance so that the leaf spring, together with the protuberance, can flex inwardly of the knife handle with relative ease to release or engage a knife tang. Due to the sloped surface of the protuberance 150 and to the correspondingly sloped rim of the protuberance 148 (see FIG. 6) a camming action is provided when, with the collar 156 adjacent the rear end of the leaf spring 144, a knife blade is pulled forwardly. This camming action exerts a force sufficient to swing the protuberance out of its aperture in the knife tang, thus permitting the knife blade to be removed with ease.

To prevent the collar from accidentally being displaced from its blade locking position with the C-spring bearing on the tip of the leaf spring, I provide a detent which cooperates with the collar. Said detent is in the form of a squat rounded boss 172 (see FIGS. 4 and 5) on the inside face of the leaf spring in a position just barely cleared by the collar when the latter is in its blade locking mode, as shown in FIGS. 4 and 5. When the collar is slid forwardly to its locking mode, the base of the C-spring will ride up over the boss, due to the resiliency of the C-spring, and the C-spring, after it clears the collar, will snap into locking position. However, the longitudinal force required to ride the C-spring over the boss is sufficiently high, i.e., about one pound, to maintain the C-spring with the collar in its locking mode against accidental displacement. To release a blade, the unlocking-collar-displacing force is applied in a retrograde manner, so that the rear edge of the C-spring will engage the front edge of the boss and the C-spring will ride back over the boss.

It will be appreciated that the aforesaid locking mechanism provides a convenient arrangement for holding the blades free from play, thus ensuring an operation which is completely smooth and true and preventing the blades from coming loose of their own accord. This represents a safety factor which is lacking in conventional power operated slicing knives wherein accidental depression of the tip of a blade retaining leaf spring located near the front end of the handle can inadvertently release a knife blade.

Manually manipulatable means is included to slide the collar from its locking mode (shown in FIG. 4) to its retrograde position near the bases of the leaf springs 144 where it will permit said leaf springs to flex inwardly at such time as it is desired to remove or insert a slicing blade simply by pulling it away from or pushing it into the handle. Said means quite simply comprises a locking lever 174 (see FIGS. 4, 5 and 6). As shown, the lever is fabricated from sheet metal and includes a handle 176 which, in closed position, is shaped to be received in a shallow groove 177 in the undersurface of the handle and specifically in the undersurface of the lower half-shell.

The forward end of the handle carries in one-piece therewith, a pair of spaced parallel side plates 178 of identical configuration which between them embrace and bear slidably on the sides of the skeleton frame 54. The side plates are pierced in registry to provide bearing openings 180 that admit the trunnion ends of a pin 182 carried by and extending transversely through the central spacer block 66. Thereby, the locking lever is oscillatably connected to the frame 54.

The side plates are formed with registered arcuate cam slots 184 eccentrically disposed with respect to the pin 182 about which the locking lever turns. Riding in these two slots are follower pins 186 that extend outwardly from and are carried on the shoes 158. The slots 184 are so configured that when the locking lever 174 is in its open, i.e., blade admitting or discharging, position, as shown in dot and dash lines in FIG. 3, the follower pins are at the ends of the slots radially closest to the axis of rotation of the lever so that the pins and the shoes have been retrogradely urged toward the rear ends of the leaf springs 144 by the movement of the lever into such position. The opposite ends of the arcuate slots are located radially more remotely from the pin 182 so that turning the lever 174 to its locked position, shown in full lines in FIG. 3, shifts the shoe 158 forwardly to that position of the collar which locks the blades in the slots by causing the C-springs 160 to bear against the forward ends of the leaf springs 144 in front of the bosses 172. The torque advantage secured by the lever makes the operation easy to perform by a user.

Attention is called to the fact that the radially remote ends of the arcuate slots are enlarged in a direction parallel to movement of the push rods when the locking lever is in blade locking position. The extent of the longitudinal enlargement is sufficient to permit reciprocation of the slicing blades and push rods during a slicing operation without the pins 186 tapping the edges of the slots, so that when the locking lever is in a blade locking position it will permit the collar to reciprocate with the push rods.

Desirably, means is incorpoarted to releasably hold the locking lever in blade locking position. Such means, as herein shown, takes the form of a V-shaped notch 188 in the rear edge of one or both of the side plates 178. Each notch receives a resilient pin 190 when in locked position, the pins being carried by a base segment 192 of the rear separator block 68. It will be apparent that the pins bear against the rear edges of the side plates as the locking lever approaches locked position and are flexed rearwardly thereby, so that the pins snap into the notches 188 when the locking lever reaches blade locking position. The walls of the locking notches are sloped sufficiently to permit them to cam the pins rearwardly when the locking handle is swung away from blade locking position.

The lower half-shell is formed with slots (not shown) to permit the side plates to move into and out of the handle casing as it is moved between its two extreme positions shown in FIG. 3.

The lead wires 44 (FIG. 5) run to a normally open momentary power control switch 194 carried by the handle, so that a user of the knife can turn the motor 20 off and on with the same hand that grasps the handle 50.

Although the switch may be of any suitable form, one simple switch has been illustrated. The same comprises a fixed contact 196 carried by the electrically non-conductive plate 58 and connected to one of the lead wires 44. The switch further includes a movable contact 198 supported on a flexible leaf spring 200, the base of which is fixed to the front end of the electrically non-conductive plate 58. An electrical connection (not shown) is effected between said leaf spring and the other lead wire 44. The contact 98 is in registry with the contact 196 and in the repose position of the leaf spring 200 is spaced therefrom.

A finger button 202 fixed to the leaf spring 200 protrudes through an opening 204 in the lower half-shell of the casing 52 where it can easily be manipulated by the index finger of the hand of a person gripping the handle 50. When the button is pressed inwardly of the casing, it shifts the contact 198 against the contact 196 to interconnect the lead wires 44 at this point. These lead wires are connected in series between the electric motor 20 and the power cable (not shown), so that when the normally open momentary switch is closed, the power circuit to the motor is completed to energize the same and revolve the flexible drive shaft 34.

A convenient blade storage slot 206 is formed in a side of the base 12 to receive the blades when they are not in use.

As will be readily apparent from the foregoing description, when the power operated knife 10 is packaged, displayed, or not being used in the home, it is a particularly compact small unit. The power line cord is stored in an out of the way compartment. The power cable is stored in the groove 48. The slicing blades are stored in the slot 206. At such time, the knife handle 50 is sealed on top of the base 12 with the cable end of the handle received in an upwardly facing slot of a fork 210 carried by the base, with the length of the handle resting in a shallow groove 212 which extends for most of the length of the base and with the front end of the handle situated between a pair of upwardly extending tabs 214 affixed to the base. To prevent accidental upward movement of the handle, as if the same should be jarred, and further to prevent longitudinal movement of the handle, a locking finger 216 is mounted on the base for pivotal movement about a lower end within the base. The tip of the locking finger is biased rearwardly by a spring (not shown) and is formed with a small rearwardly extending tooth that is received within a correspondingly shaped recess 218 at the lower part of the front face of the lower half-shell of the handle. The pressure exerted by the spring is quite slight and, as noted above, simply acts as a minimum impediment to upward movement of the handle which is easily overcome when it is desired to lift the handle out of the fork 210 and groove 212.

When it is desired to use the knife, the handle is picked off the rest and the locking lever 174 is swung to blade accepting position, shown in dot and dash lines in FIG. 3. This frees the protuberances 148. Thereupon, the blades are plucked from the storage slot and slid through the spaces provided on opposite sides of the front separator block 60 and the inner faces of the enlarged front ends of the push rods. The tangs of the blades thereby are guided into the spaces between the inner faces of the enlarged front ends of the push rods and the facing leaf springs 44. In the process of such movement the rear edges of the tangs cam the protuberances 148 to out-of-the-way positions until the tangs are fully seated on the push rods. The protuberances snap into the apertures 150 and are locked there by movement of the locking lever 174 to its full line position shown in FIG. 3.

The light compact handle is gripped by the user in a manner convenient for a slicing operation and the user with his index finger actuates the switch 194 to set the motor 20 in operation. The motor turns the flexible drive shaft which rotates the swash plate and reciprocates the push rods so as to slide the blades back and forth on one another in a slicing motion.

It thus will be seen that I have provided a device which achieves the several objects of my invention and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A power operated slicing knife, comprising a stationary base, a motor on said base, said motor having an output shaft, a knife handle, a flexible tether connecting said knife handle to said base, said tether including a flexible drive shaft connected at one end thereof to the motor output shaft, a slicing blade, a rotary-to-reciprocatory converting mechanism carried by the handle and having a rotary driven end and a reciprocatory driving end, the other end of the flexible drive shaft being connected to the driven end of the converting mechanism, and means carried by the handle for detachably securing the slicing blade to the driving end of the converting mechanism, said detachable blade securing means comprising a tang on the blade, an opening in the tang, a reciprocatory rod forming a part of the converting mechanism, a blade receiving seat in the rod, a leaf spring carried by the rod, a protuberance mounted on the leaf spring and disposed to enter the tang opening when the blade is on the rod seat, a collar slidable along the rod between a first position in which it bears against the portion of the leaf spring on which the protuberance is mounted so as to inhibit movement of the protuberance out of the tang opening and a second position in which it is clear of said portion of the leaf spring so as to permit the protuberance to shift out of the opening, and a manually manipulatable element on the exterior of the handle arranged to shift the collar between said two positions.

2. A power operated slicing knife as set forth in claim 1 wherein the manually manipulatable element is a lever pivotally connected to the handle and having a cam slot, and wherein the collar has a follower pin riding in said slot to shift the collar between the two positions thereof.

3. A power operated slicing knife as set forth in claim 2 wherein the cam slot is enlarged at the location of the pin corresponding to the first position of the collar, said enlargement being in a direction parallel to the direction of reciprocation of the rod.

4. A power operated slicing knife as set forth in claim 1 wherein the collar includes a spring arranged to bear against the said portion of the leaf spring, and wherein the leaf spring includes a detent arranged to coact with the collar spring so as to hold the collar in its first position against accidental displacement and to be overridable when the collar is to be shifted to its second position by actuation of the manually manipulatable element.

References Cited
UNITED STATES PATENTS

| | | | |
|---|---|---|---|
| 1,617,924 | 2/1927 | Russell | 30—272 |
| 2,168,703 | 8/1939 | Dziedzic et al. | 30—272 X |
| 2,722,072 | 11/1955 | Aspeck | 30—272 X |
| 3,234,649 | 2/1966 | Preble et al. | 30—272 |
| 3,303,563 | 2/1967 | Peterson | 30—272 |
| 3,300,858 | 1/1967 | Young | 30—272 |

JAMES L. JONES, JR., *Primary Examiner.*